United States Patent Office 2,964,519
Patented Dec. 13, 1960

2,964,519
METHOD OF MAKING A LIGNOCELLULOSE PRODUCT

Arthur E. Gabriel, Ocean Grove, N.J., assignor to Caradco Incorporated, a corporation of Iowa No Drawing. Original application May 4, 1955, Ser. No. 506,091, now Patent No. 2,855,320, dated Oct. 7, 1958. Divided and this application July 16, 1958, Ser. No. 748,785

10 Claims. (Cl. 260—124)

This invention relates to methods of making a lignocellulose product and the products resulting therefrom.

This application is a division of my co-pending application, Serial No. 506,091, filed May 4, 1955, now Patent 2,855,320, issued October 7, 1958.

One of the objects of this invention is to provide an improved method of making a lignocellulose product consisting essentially of intimately mixing particles of lignocellulose material with an activator that is either iron sulfate and silica gel or iron sulfate and calcium carbonate and lignin, and heating said mixture under pressure for a time and at a temperature sufficient to combine chemically at least a major portion of said activator with said lignocellulose.

Another object of the invention is to provide an improved method of making a lignocellulose product consisting essentially of intimately mixing particles of lignocellulose material with up to about 20% by weight of an activator that is either iron sulfate and silica gel or iron sulfate and calcium carbonate and lignin, and heating said mixture under pressure for between about 0.1–60 minutes at between about 400–700° F. during at least a portion of the heating period to combine chemically at least a major portion of said activator with said lignocellulose.

Other objects and advantages of the invention will be readily apparent from the following detailed description of the invention.

In general, the method of this invention involves mixing finely divided lignocellulose with the above-mentioned activator to form a substantially homogeneous mixture which is then heated to combine chemically at least a portion of the activator and the lignocellulose. Where the mixture is given a preliminary heat treatment, the product is a thermoplastic molding composition capable of being molded under pressure and heat to produce a product having the shape of the mold cavity.

The preheat product may be stored if desired and then later molded under heat and pressure in a mold of suitable shape to produce articles as described above.

It has long been known that lignocellulose particles such as finely divided wood can be compressed into a coherent mass by heat and pressure as the heat apparently causes the lignin to become plastic and serve as a binder. The temperatures required, however, are so high that they cause rapid and almost spontaneous decomposition of the lignocellulose so that this method is not practical. The methods of this invention greatly minimize such decomposition so that a plastic mass is produced that can easily be molded under pressure.

The lignocellulose used is preferably relatively dry and in the preferred process does not contain over about 30% of water by weight of the dry lignocellulose, which is approximately the fiber saturation point.

The lignocellulose that may be used includes wood and lignocellulosic vegetable materials as well as partially hydrolyzed or pulped lignocellulose. In order to insure intimate contact of the materials, the lignocellulose is preferably finely divided, with the particles preferably being not coarser than an average of about 20 mesh although an average of 50 mesh particles produces a smoother, stronger and finer-grained final product.

The amount of each ingredient in the mixtures of iron sulfate plus silica gel and of iron sulfate plus calcium carbonate plus lignin is preferably not less than about 0.3% by weight.

The particle size of each chemical compound should be small in order to insure even distribution of the compound throughout the mass and to bring the compound into intimate contact with the particles of lignocellulose. In general, this particle size is preferably not coarser than about 50 to 100 mesh, and is preferably not finer than 200 or 300 mesh. This means that the compound used has an average particle size passing through standard screens of these sizes.

In preparing the products of this invention, the lignocellulose material and the activator are intimately mixed to produce a substantially homogeneous mass. This mixture is then preferably compacted so that during the subsequent heating step relatively good heat transfer is achieved. The mixture may then be given an initial heating or preheat, either under no pressure or light pressure, in order to combine chemically a portion of the activator with the lignocellulose material. This initial heat treatment where employed makes the resulting product relatively thermoplastic for subsequent molding operations. The preheat temperature is relatively high in order to drive off vapors and to cause the chemical combination of at least a portion of the chemical compound or mixture. However, the preheat temperature is maintained low enough so that excessive charring is avoided and high boiling compounds are not lost.

The product of this preheat treatment is a molding composition that is capable of being molded under pressure and heat in a mold of desired shape to produce molded products. This molding composition is a mixture of substantially dry lignocellulose with some chemically reacted lignocellulose substantially uniformly distributed therethrough. In the preferred preheat process, the temperature is maintained between about 400 to 700° F. and this temperature maintained for about 0.1 to 15 minutes. In general, a temperature of about 500 to 550° F. has been found to be highly satisfactory.

The thermoplastic molding composition prepared as described may be molded in a heated pressure mold of the desired shape to produce molded products. In this step the preheat composition is compressed for a relatively brief period at a desired pressure and heated at a temperature which may be somewhat lower than the preheat temperature if desired, but which may be substantially the same as the preheat temperature, if desired. In the preferred method this molding temperature will be between about 250° to 700° F. The time of molding is such that the total time, including the preheat time if a preheat is used, is between about 0.1 to 60 minutes.

The pressure that is employed is governed by the desired characteristics in the final product. In general, this pressure will be between about 50 and 5,000 pounds per square inch, although higher and lower pressures may be employed, depending upon the desired characteristics of the final product. At the lower pressures, the product will be found to be relatively low in density and relatively porous. At the higher pressures the product is hard, dense and compact and more nearly resembles molded thermosetting resins.

In the final molding operation the pressure is maintained during the heating operation for a time sufficient to set the mixture. As is pointed out above, the total heating including the preheat and the final molding operation is preferably between about 0.1 to 60 minutes.

In the following table there is set out a number of examples of producing products according to this invention. The first column of the table sets out the example number. The second column identifies the particular activator or chemical compound or mixture employed, while the third column sets out the amount of activator and percentage by weight. The fourth column gives the temperature of both the preheat and the final molding, while the fifth column gives the preheat time in minutes, except where otherwise indicated, for the preheating step. Where no preheat is used in any example, this time is indicated as "0." The final column gives the molding time in minutes in the final molding step.

In each example, finely divided ponderosa pine wood having a maximum particles size of about 50 mesh and substantially bone dry was mixed with the stated amount of the specified activator. The wood and the activator were intimately mixed to produce a substantially homogeneous product. A mass of this mixture about 1¾ inches thick was then partially compacted into a square mold frame about one inch deep. The mixture rested on a fine mesh wire screen which was supported on a metal plate. The plate, screen and frame had been preheated to the specified temperature. A preheated metal top plate and block were then placed on the mold with the mixture therein placed on a heated platen of a press. The mixture within the mold was compacted to a pressure of about 400 pounds per square inch in order to increase the efficiency of heat transfer through the mass and this pressure then removed. The heated platen was maintained at a temperature such as to heat the mixture to the specified temperature and this temperature was maintained for the specified preheat time. The screen aided in venting the gases given off during this preheat.

At the end of the preheat period, the partially reacted mass was compacted between the heated platens of the press for the specified molding time at the particular temperature given. At the end of this time period, the pressure was released and the finished product removed from the mold.

In those instances where no perheat was employed, the mixture of wood and activator was placed directly in the press and heated at the specified temperature and at a pressure of 700 pounds per square inch for the molding time given in the last column of the table. The molding time is in minutes unless otherwise stated.

| Ex. No. | Activator | Percent by wt. | Temp., °F. | Preheat time (min.) | Molding time (min.) |
|---|---|---|---|---|---|
| 1 | FeSO$_4$·7H$_2$O / Silica Gel | 10 / 5 | 550 | 5 | 5.0 |
| 2 | FeSO$_4$·7H$_2$O / Silica Gel | 10 / 5 | 550 | 5 | 2.45 sec. |
| 3 | FeSO$_4$·7H$_2$O / Silica Gel | 10 / 5 | 550 | 5 | 5.0 |
| 4 | FeSO$_4$·7H$_2$O / Silica Gel | 10 / 5 | 550 | 5 | 7.0 |
| 5 | FeSO$_4$·7H$_2$O / Silica Gel | 10 / 5 | 550 | 0 | 6.0 |
| 6 | Lignin / FeSO$_4$ / CaCO$_3$ | 6 / 8 / 4 | 500 | 0 | 3.0 |
| 7 | Lignin / FeSO$_4$ / CaCO$_3$ | 6 / 8 / 4 | 500 | 5 | 3.0 |
| 8 | Lignin / FeSO$_4$ / CaCO$_3$ | 6 / 8 / 4 | 540 | 0 | 3.0 |
| 9 | Lignin / FeSO$_4$ / CaCO$_3$ | 6 / 8 / 4 | 540 | 5 | 3.0 |
| 10 | FeSO$_4$ / CaCO$_3$ / Lignin | 5 / 2 / 6 | 500 | 0 | 3.0 |
| 11 | FeSO$_4$ / CaCO$_3$ / Lignin | 5 / 2 / 6 | 500 | 5 | 3.0 |
| 12 | FeSO$_4$ / CaCO$_3$ / Lignin | 5 / 2 / 6 | 500 | 5 | 5.0 |
| 13 | FeSO$_4$ / CaCO$_3$ / Lignin | 10 / 5 / 6 | 500 | 0 | 1.5 |
| 14 | FeSO$_4$ / CaCO$_3$ / Lignin | 10 / 5 / 6 | 500 | 5 | 3.0 |
| 15 | FeSO$_4$ / CaCO$_3$ / Lignin | 10 / 5 / 6 | 500 | 5 | 5.0 |
| 16 | FeSO$_4$ / CaCO$_3$ / Lignin | 10 / 5 / 6 | 500 | 5 | 10.0 |
| 17 | FeSO$_4$ / CaCO$_3$ / Lignin | 10 / 5 / 6 | 500 | 5 | 7.0 |
| 18 | FeSO$_4$ / CaCO$_3$ / Lignin | 10 / 5 / 6 | 500 | 0 | 5.0 |
| 19 | FeSO$_4$ / CaCO$_3$ / Lignin | 10 / 3.5 / 6 | 500 | 5 | 5.0 |
| 20 | FeSO$_4$ / CaCO$_3$ / Lignin | 10 / 3.5 / 6 | 500 | 5 | 7.0 |
| 21 | FeSO$_4$ / CaCO$_3$ / Lignin | 10 / 3.5 / 6 | 500 | 5 | 4.0 |

Having described my invention as related to the embodiment set out herein, it is my intention that the invention be not limited by any of the details of description unless otherwise specified, but rather be construed broadly within its spirit and scope as set out in the accompanying claims.

I claim:

1. The method of making a lignocellulose product, consisting essentially of: intimately mixing particles of lignocellulose with up to about 20% by weight of an activator of the class consisting of iron sulfate plus silica gel and iron sulfate plus calcium carbonate plus lignin, each ingredient of said class being in an amount of at least 0.3% by weight; and heating the resulting composition under pressure for a time and at a temperature sufficient to combine chemically a major portion of the activator with the lignocelluose.

2. The method of claim 1 wherein said activator consists essentially of iron sulfate plus silica gel.

3. The method of claim 1 wherein said activator consists essentially of iron sulfate plus calcium carbonate plus lignin.

4. The method of making a lignocellulose product, consisting essentially of: intimately mixing particles of lignocellulose with up to about 20% by weight of an activator of the class consisting of iron sulfate plus silica gel and iron sulfate plus calcium carbonate plus lignin, each ingredient of said class being in an amount of at least 0.3% by weight; and heating the resulting composition under pressure for between about 0.1–60 minutes and at between about 400–700° F. to combine chemically a major portion of the activator with the lignocellulose.

5. The method of claim 4 wherein said activator consists essentially of iron sulfate plus silica gel.

6. The method of claim 4 wherein said activator consists essentially of iron sulfate plus calcium carbonate plus lignin.

7. The thermal reaction product of a mixture of finely-divided lignocellulose and up to about 20% by weight of an activator of the class consisting of iron sulfate plus silica gel and iron sulfate plus calcium carbonate plus lignin, each ingredient of said class being in an amount of at least 0.3% by weight.

8. The thermal reaction product of a mixture of finely-divided lignocellulose and up to about 20% by weight of an activator of the class consisting of iron sulfate plus silica gel and iron sulfate plus calcium carbonate plus lignin, that has been heated to between about 400–700° F. for between about 0.1–60 minutes, each ingredient of said class being in an amount of at least 0.3% by weight.

9. The thermal reaction product of a mixture of finely-divided lignocellulose and up to a total of about 20% by weight of iron sulfate plus silica gel, each in an amount of at least 0.3% by weight, the mixture having been heated to between about 400–700° F. for between about 0.1–60 minutes.

10. The thermal reaction product of a mixture of finely-divided lignocellulose and up to a total of about 20% by weight of iron sulfate plus calcium carbonate plus lignin, each in an amount of at least 0.3% by weight, the mixture having been heated to between about 400–700° F. for between about 0.1–60 minutes.

References Cited in the file of this patent
UNITED STATES PATENTS 2,855,320    Gabriel _____ Oct. 7, 1958